Patented Feb. 20, 1940

2,190,747

UNITED STATES PATENT OFFICE 2,190,747

WATER SOLUBLE NAPHTHOL COMPOUNDS AND THE PROCESS OF PREPARING SAME

William Leo Walsh, East Greenbush, and William Henry von Glahn, Loudonville, N. Y., assignors to General Aniline & Film Corporation, a corporation of Delaware No Drawing. Application April 20, 1938, Serial No. 203,204

10 Claims. (Cl. 260—621)

This invention relates to the manufacture of stable, water-soluble naphthol compounds.

Various naphthols and naphthol derivatives have been used in the formation of azoic colors, for example the Rapidogen colors, and in the development of substantive dyestuffs. The naphthols and naphthol derivatives that have been used for these purposes are insoluble in water and since they must be used in solution, they have generally been dissolved in aqueous caustic alkali. In addition to the caustic alkali, it has been common to add soluble oils, such as Turkey red oil in order to obtain better wetting-out and a more even distribution of the naphthol solutions throughout the fiber. Numerous difficulties have been encountered in the use of these solutions. If only sufficient caustic alkali is added to form the alkali metal salts of the naphthol compound, the resultant product is not completely soluble due to hydrolysis in water. Accordingly, to form clear solutions, an excess of free caustic alkali is added, the amount of excess being a variable, dependent more or less upon the judgment of the persons making up the solutions. Most of these solutions, particularly those of β-naphthol, are subject to oxidation by air and must be freshly prepared and used within a short period of time as otherwise decomposition quickly sets in due to oxidation by air. Such partially decomposed solutions yield dull shades of inferior fastness. Although the control of alkalinity of these solutions is essential in order to obtain the best results as to depth and brightness of color and stability of solutions and printing pastes, such control has never been obtained to the fullest degree.

It is, therefore, the object of the present invention to provide water-soluble naphthols and naphthol derivatives of controlled alkalinity and which do not contain an appreciable excess of caustic alkali.

It is also an object of our invention to produce solid, dry compounds of the naphthols and their derivatives which are indefinitely stable in dry form and which dissolve completely in water without any further additions.

We have found that water-soluble naphthols and naphthol derivatives of controlled alkalinity can be prepared by treating such compounds with at most an equimolecular amount of an alkali metal hydroxide and an alkali metal silicate. Furthermore, the alkali metal salts of the naphthols and naphthol derivatives, that is the naphtholates, can be treated with alkali metal silicate to form a stable, water-soluble compound. Moreover, mixtures of the naphthol and naphtholate can be used. Obviously when the naphtholate is used, a smaller quantity of silicate is necessary than when the naphthol per se is used. In any event there is added to the compound to be solubilized at most only sufficient free alkali to convert the hydroxyl group of the organic compound into the alkali metal salt and that further alkalinity is provided by an inorganic alkali metal silicate.

The naphthol, naphthol derivatives and the like which have been subjected to this treatment are rendered easily soluble in cold water and form solutions of high stability. The alkali metal silicate maintains the solutions at the desired optimum alkalinity. Accordingly hydrolysis of the naphthol derivative and the formation of an insoluble or difficultly soluble hydrolysis product is avoided. Moreover, the maintenance of a uniform pH value produces optimum results in the formation of and after-treatment of dyeings. A further unforeseen advantage of the use of these alkali metal silicates is the stability of the dry, solubilized products on storage due to their increased resistance to the absorption of water and carbon dioxide when exposed to the air.

The compounds which we propose to solubilize by our process are in the first instance the naphthols per se and particularly β naphthol, alkyl, alkoxy, phenoxy, halogen and nitro substituted naphthols, hydroxy anthracenes, heterocyclic compounds such as hydroxycarbazoles, hydroxybenzocarbazoles and finally compounds containing one or more reactive methylene groups capable of coupling with diazo compounds. All of the above mentioned compounds are characterized by freedom from water solubilizing groups such as carboxylic-, sulfonic and sulfinic acid groups and the presence of a hydroxy group in ortho or para position to a free position which enables these compounds to couple with diazonium compounds.

The following examples illustrate the method of carrying out our invention. It is to be understood that these examples are intended to be merely illustrative and the present invention is by no means limited thereto.

*Example 1.*—43.2 grs. of β-naphthol are added to 12.2 grs. of 100% caustic soda as a concentrated solution. The mixture is heated to 80 to 90° C. while stirring until a uniform melt has been obtained. 17.5 grs. of sodium metasilicate are stirred in a 80 to 90° C. and the product dried at 40 to 50° C. under 29″ of vacuum. The dry material is ground well to a white powder which is readily soluble in cold water.

*Example 2.*—57.6 grs. of β-naphthol are added to 16 grs. of 100% sodium hydroxide as a concentrated solution containing 3 grs. of sodium stannate. The mass is heated at 80 to 90° C. while stirring until uniform. Then 20 grs. of potassium silicate are added at 80 to 90° C. while continuously stirring, the product is dried at 45° C. under 29" of vacuum and ground to a fine white powder, which is easily soluble in cold water.

*Example 3.*—71.4 grs. of 1.4-hydroxy-chlor-naphthalene are added to 22.4 grs. of potassium hydroxide as a concentrated solution and the mass is stirred into a smooth paste at 80 to 90° C. 20 grs. of potassium silicate are added at 80 to 90° C. while stirring. The product is then dried at 40 to 50° C. in vacuo and ground to fine greyish white powder, which is easily soluble in water.

*Example 4.*—57.6 grs. of β naphthol are dissolved in a solution containing 57.6 grs. of sodium metasilicate. The solution is heated at about 80 to 90° C. while stirring until uniform and the solution is then dried at 40 to 50° C. under 29" of vacuum. The dry material is ground well to a white powder which is readily soluble in cold water.

The scope and spirit of the present invention is not to be regarded as limited by the foregoing examples since numerous variations are possible. For example, if desired, alkali-metal stannates, colloidalizing or wetting-out agents or similar products may be added to our compounds.

We claim:

1. The process for the manufacture of stable, water-soluble, aromatic and heterocyclic compounds free from water solubilizing groups such as the carboxylic-, sulfonic- and sulfinic acid groups, which compounds due to the presence of one or more hydroxy groups therein are capable of coupling with diazonium components, which comprises treating said compounds with at most an equimolecular amount of an alkali metal hydroxide in aqueous solution and simultaneously with an alkali metal silicate.

2. The process for the manufacture of stable, water-soluble naphthols and naphthol derivatives which comprises treating said compounds with at most an equimolecular amount of an alkali metal hydroxide in aqueous solution and simultaneously with an alkali metal silicate.

3. The process for the manufacture of stable, water-soluble naphthols which comprises treating β naphthol with at most an equimolecular amount of sodium hydroxide in aqueous solution and simultaneously with an amount of sodium metasilicate sufficient to maintain the naphthol in solution.

4. The process for the manufacture of stable, water-soluble naphthols which comprises treating β naphthol with sufficient sodium metasilicate in aqueous solution to completely dissolve the β naphthol.

5. The process for the manufacture of stable, water-soluble aromatic and heterocyclic compounds free from water solubilizing groups such as the carboxylic-, sulfonic- and sulfinic acid groups, which compounds due to the presence of one or more hydroxy groups therein are capable of coupling with diazonium components, which comprises treating said compounds with at most an equimolecular amount of an alkali metal hydroxide in aqueous solution and simultaneously with an alkali metal silicate and evaporating the resultant solution to dryness.

6. The process for the manufacture of stable, water-soluble naphthols which comprises treating β naphthol with at most an equimolecular amount of sodium hydroxide in aqueous solution and simultaneously with an amount of sodium metasilicate sufficient to maintain the naphthol in solution and evaporating the resultant solution to dryness.

7. The process for the manufacture of stable, water-soluble naphthols which comprises treating β naphthol with sufficient sodium metasilicate in aqueous solution to completely dissolve the β naphthol, and evaporating the resultant solution to dryness.

8. The products substantially identical with those obtained by the process defined in claim 5, said products being highly stable on storage and easily soluble in cold water.

9. The naphthols substantially identical with those obtained by the process defined in claim 6, said naphthols being highly stable on storage, and easily soluble in cold water.

10. The naphthols substantially identical with those obtained by the process defined in claim 7, said naphthols being highly stable on storage, and easily soluble in cold water.

WILLIAM LEO WALSH.
WILLIAM HENRY von GLAHN.